Figure 4:
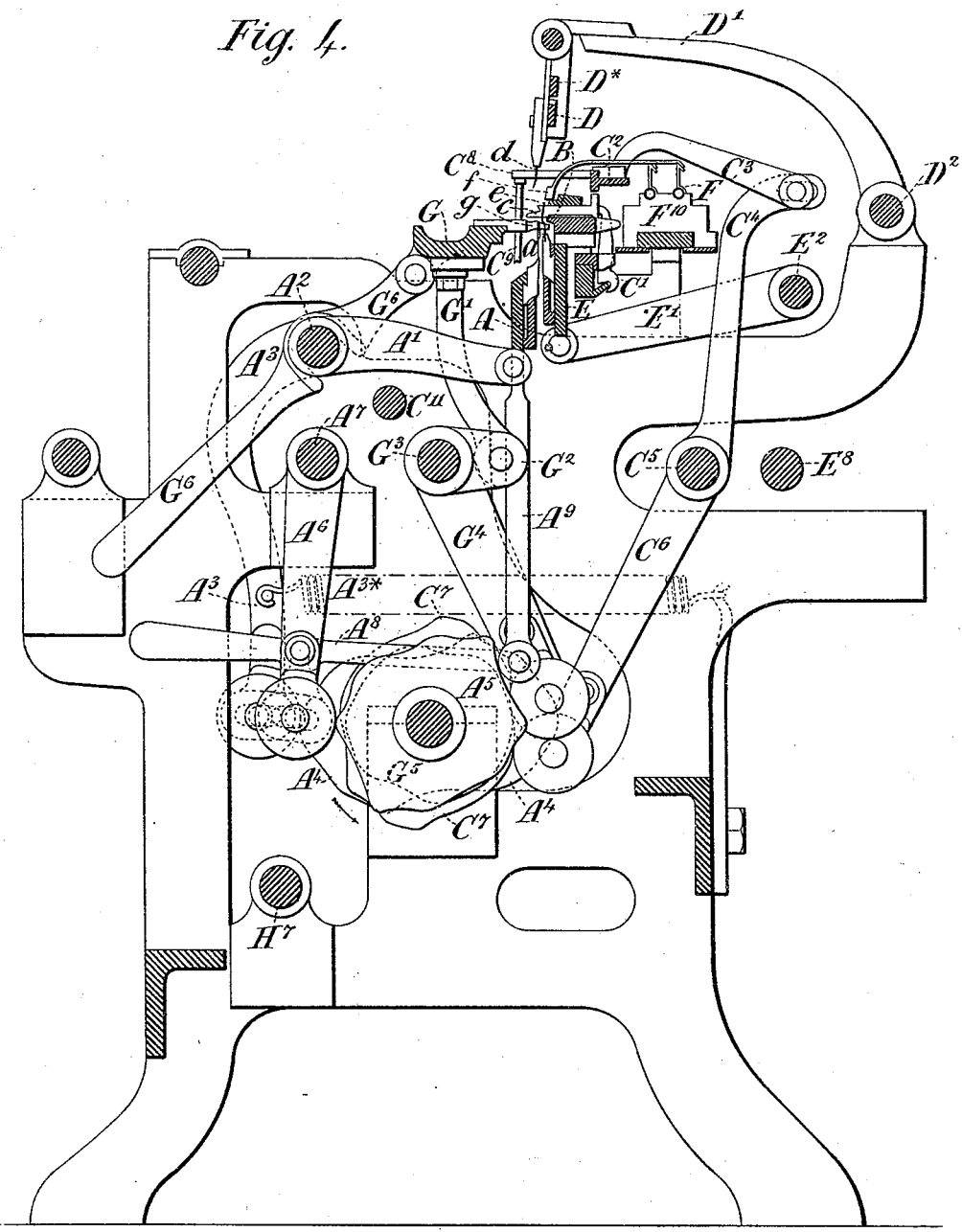

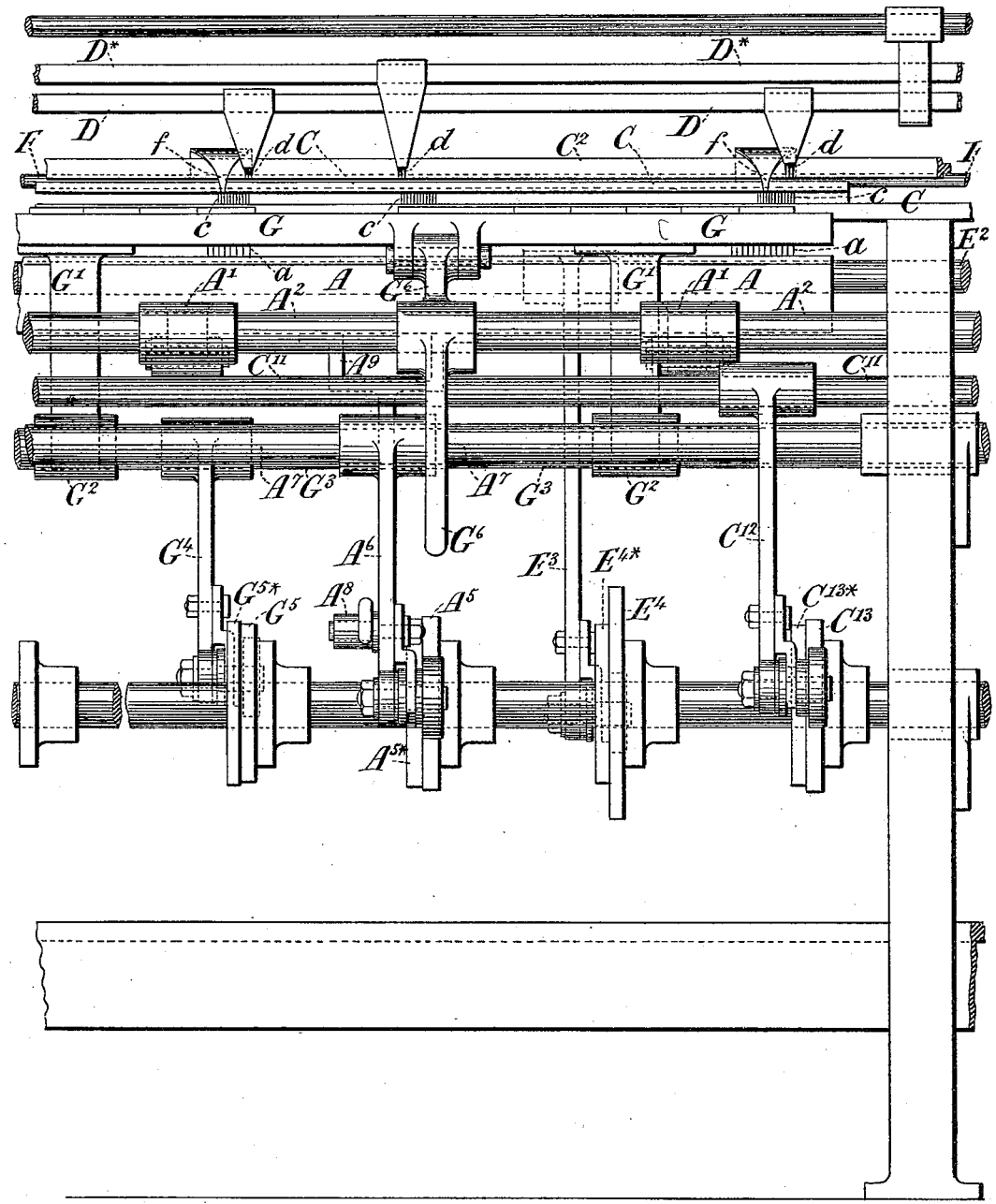

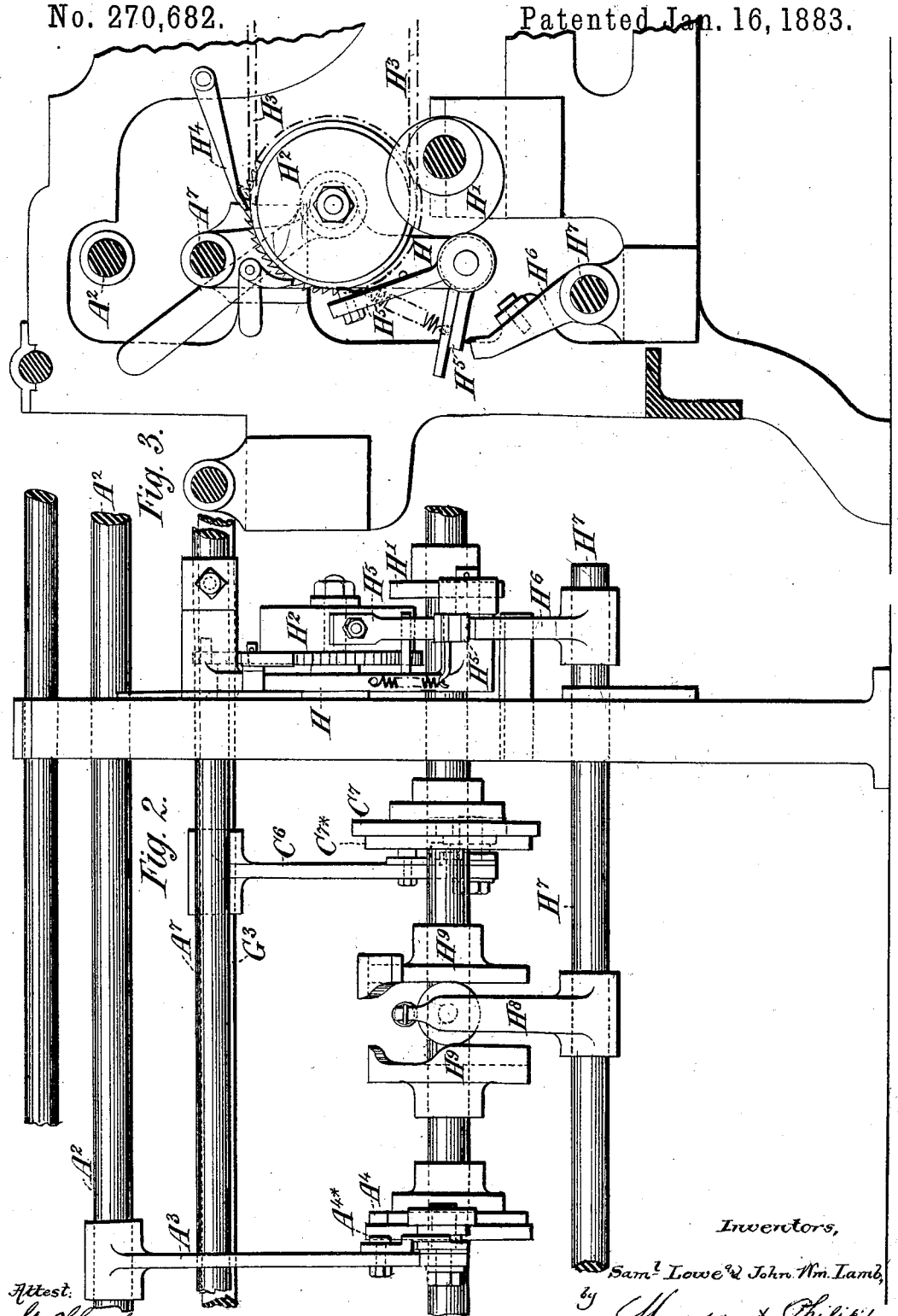

(No Model.)

S. LOWE & J. W. LAMB.

KNITTING MACHINE.

No. 270,682. Patented Jan. 16, 1883.

9 Sheets—Sheet 3.

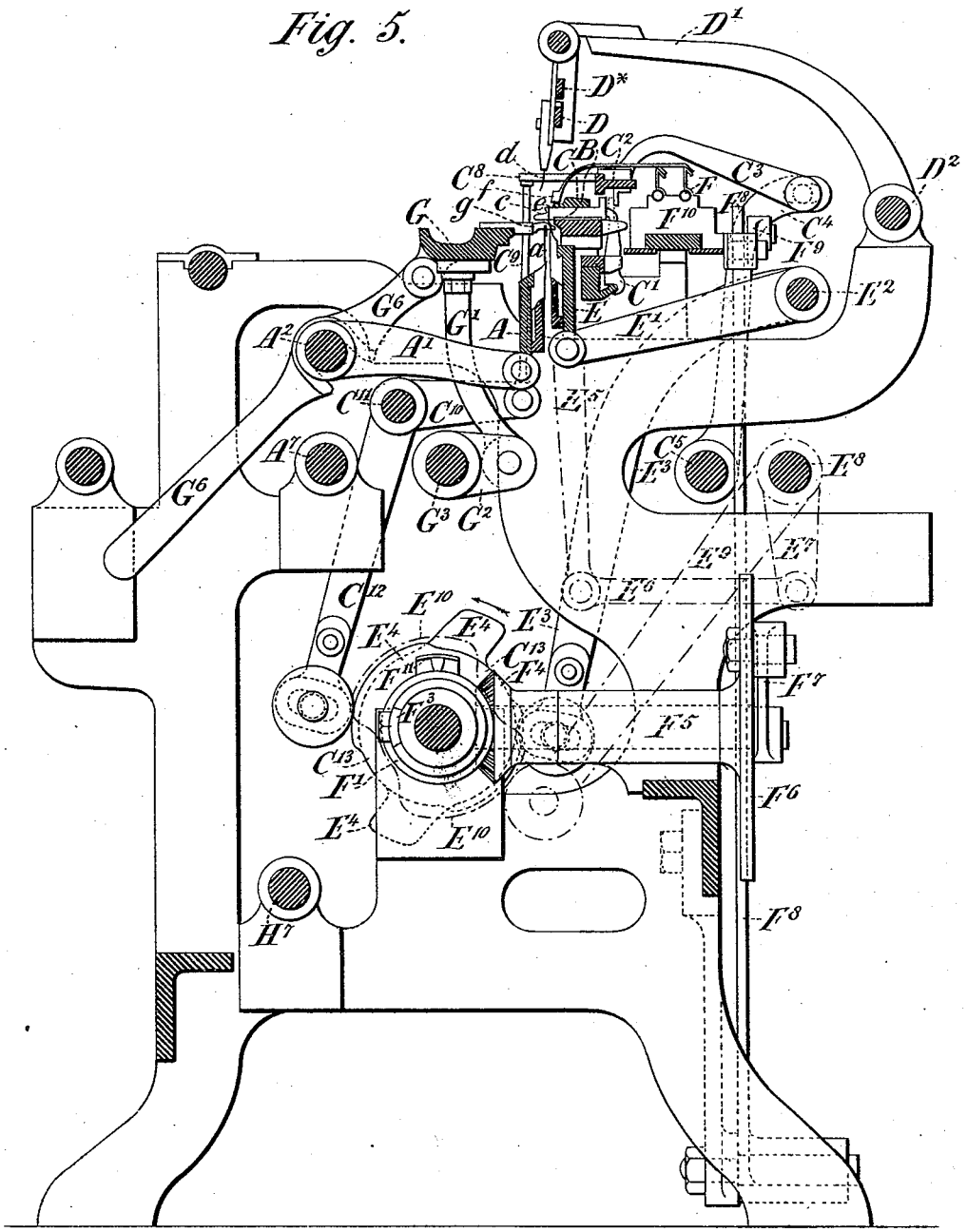

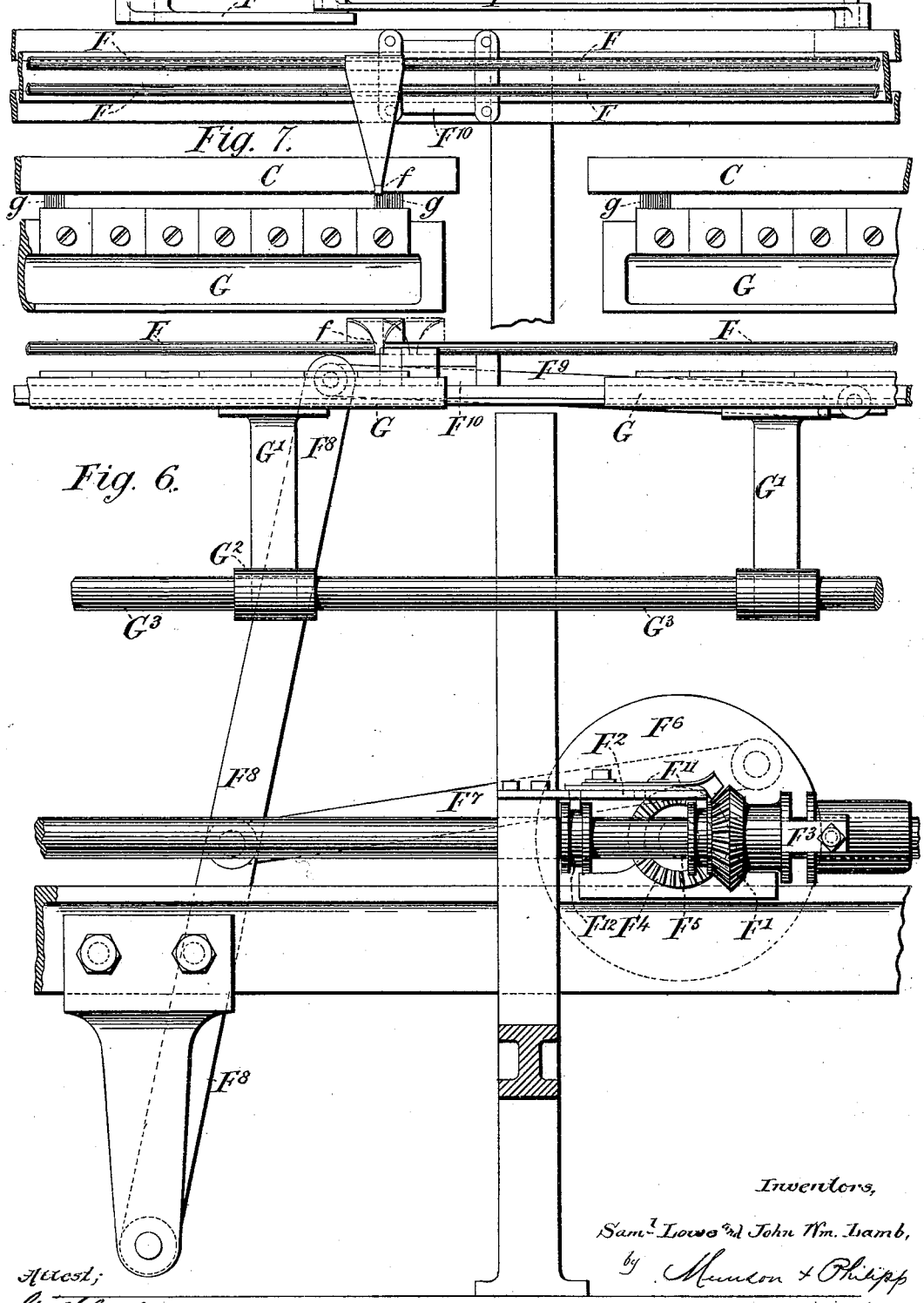

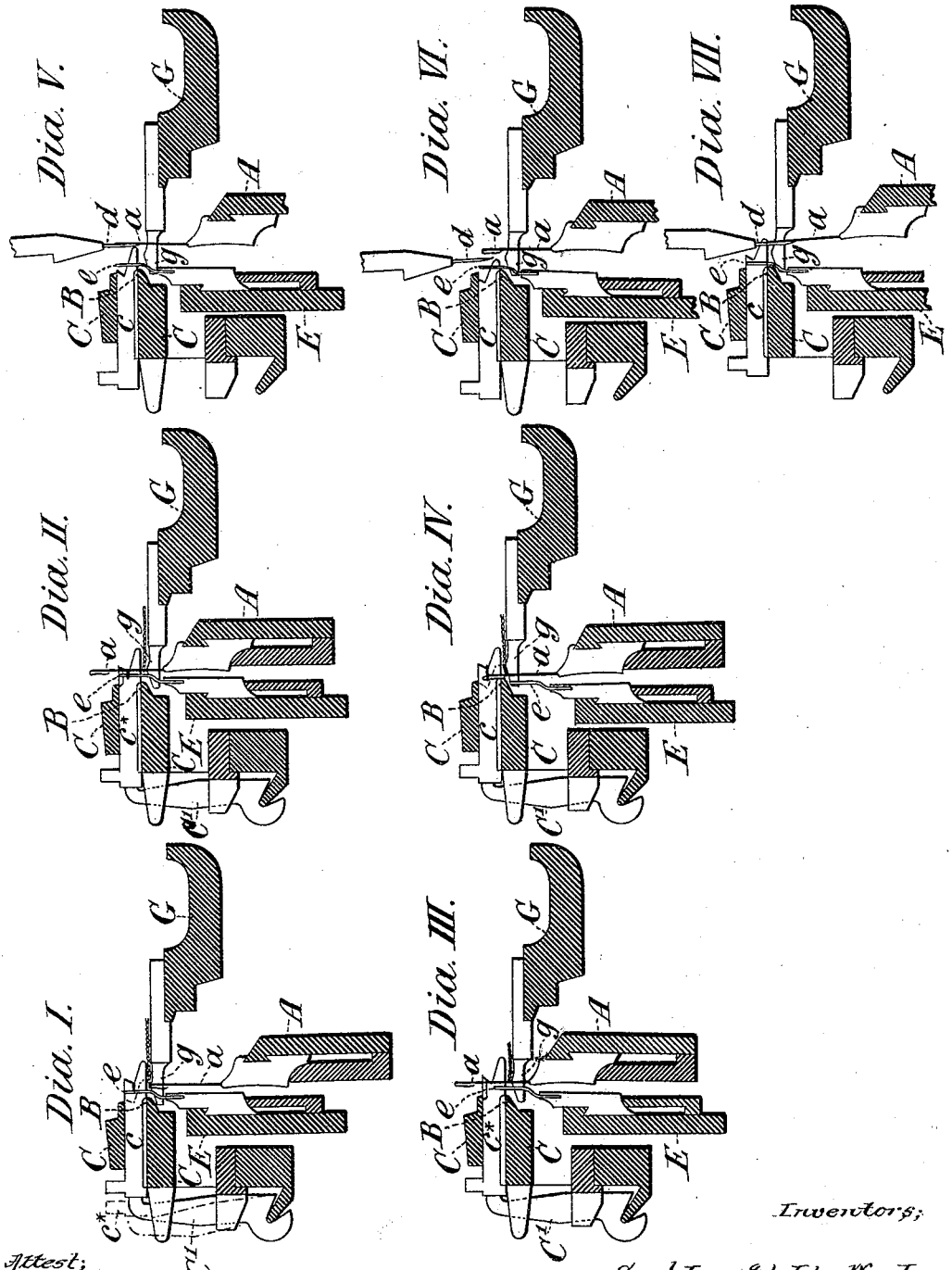

(No Model.)  S. LOWE & J. W. LAMB.  9 Sheets—Sheet 7.
KNITTING MACHINE.
No. 270,682.  Patented Jan. 16, 1883.
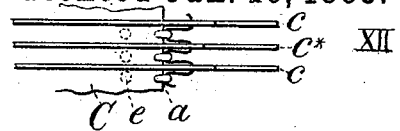
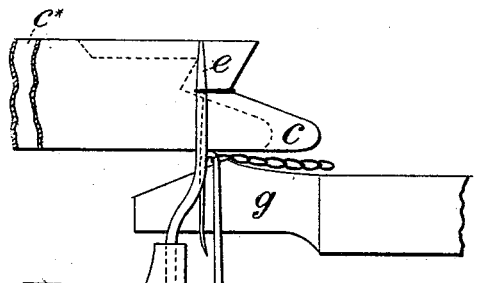
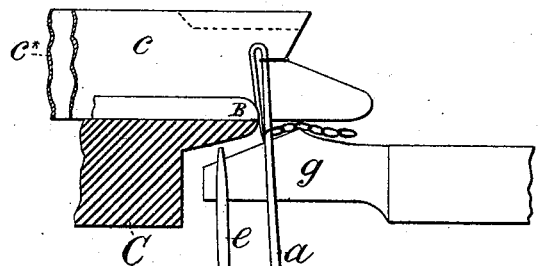
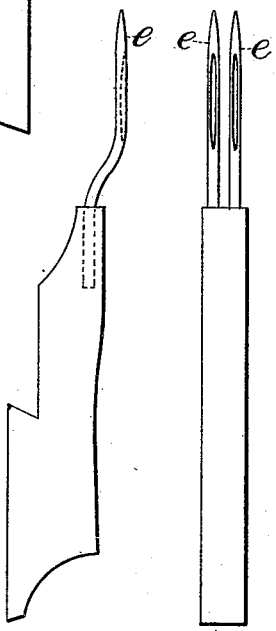
Attest:
Geo. H. Graham
A. N. Jasbera
Inventors,
Samuel Lowe and
John Wm. Lamb,
by Munson & Philipp
Attys.

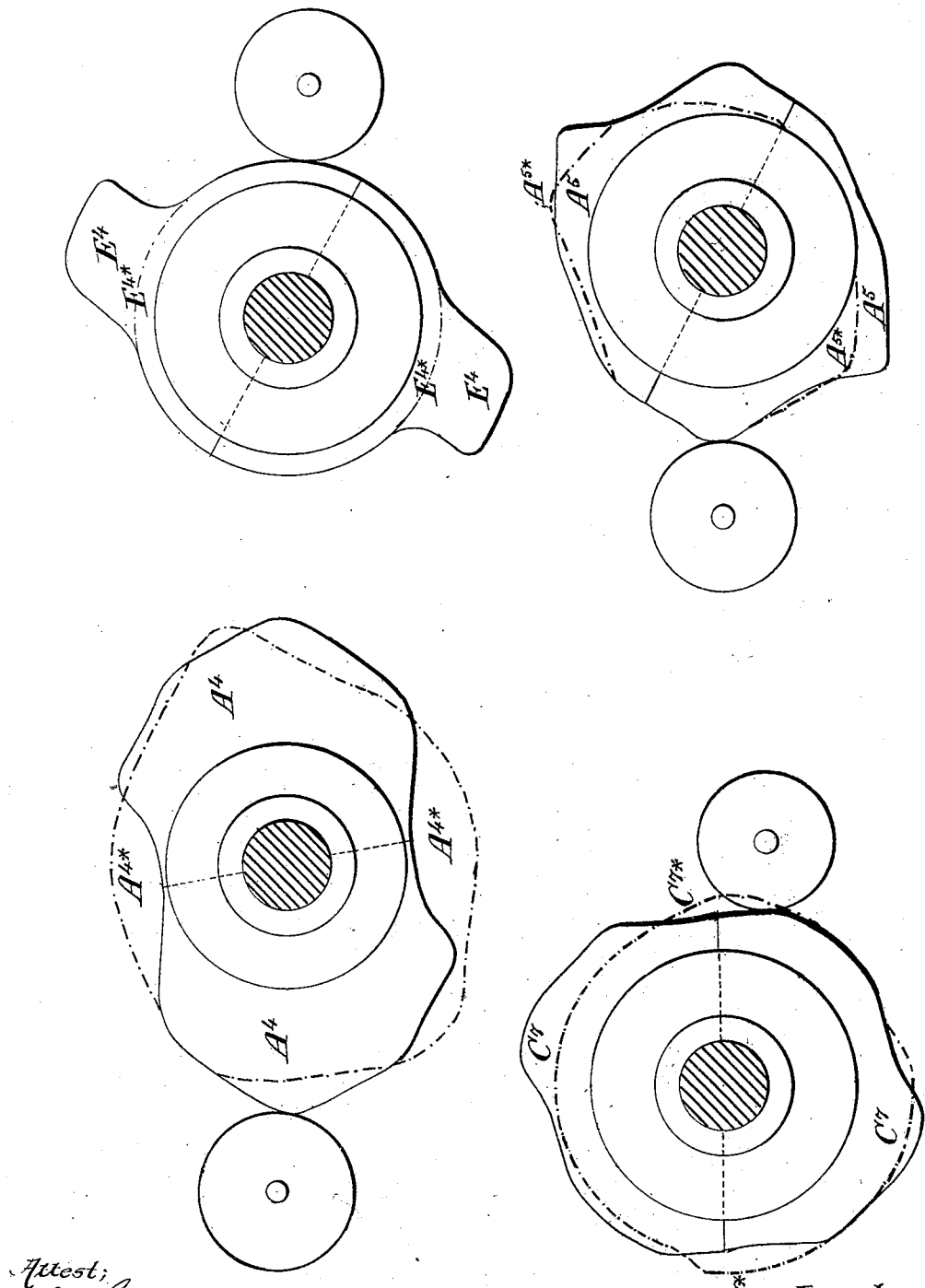

(No Model.)  S. LOWE & J. W. LAMB.  9 Sheets—Sheet 9.
KNITTING MACHINE.
No. 270,682.  Patented Jan. 16, 1883.
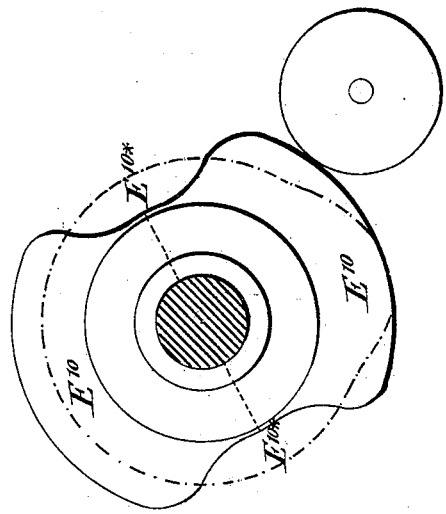
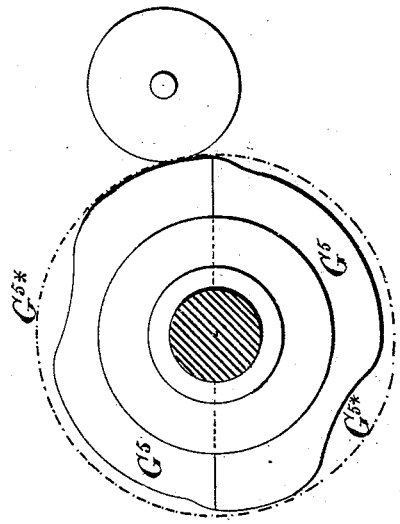
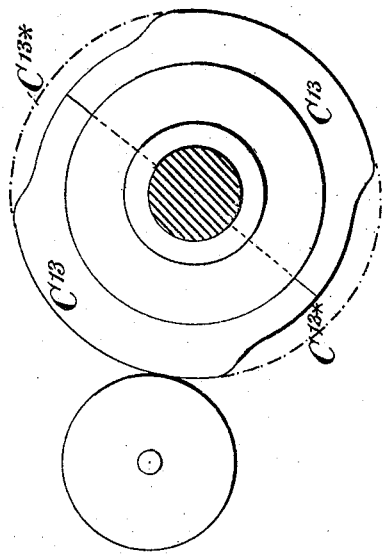
Attest:
Geo. H. Graham
A. N. Jasbera
Inventors,
Sam'l Lowe and John Wm Lamb,
by Munson & Philipp
Att'ys.

UNITED STATES PATENT OFFICE.

SAMUEL LOWE AND JOHN WILLIAM LAMB, OF NOTTINGHAM, COUNTY OF NOTTINGHAM, ENGLAND.

KNITTING-MACHINE.

SPECIFICATION forming part of Letters Patent No. 270,682, dated January 16, 1883.

Application filed February 8, 1882. (No model.) Patented in England June 23, 1880, No. 2,552; in France December 23, 1880, No. 140,308, and in Germany January 15, 1881, No. 14,748.

*To all whom it may concern:*

Be it known that we, SAMUEL LOWE, machinist, and JOHN WILLIAM LAMB, manufacturer, both of Nottingham, in the county of Nottingham, England, have invented certain Improvements in Knitting-Machines, of which the following is a specification.

This invention relates to that class of straight knitting frames which are fitted with thread-carriers known as the "Cotton" traversing thread-carriers; and it consists in certain means for facilitating the operations of the machine, and thereby increasing the rate of production of the knitted fabric, all as hereinafter described and set forth.

Hitherto in these machines the thread, as it was delivered by the thread-carrier, was pressed forward against the stems of the bearded needles by means of jack-sinkers, which took up the amount of slack required for the formation of a row of loops, and then, with the aid of intervening dividing-sinkers, properly sunk or laid the thread upon the stems of the several needles. While this double operation was taking place the needles had to remain quiescent in a raised position, in order that the loops might be caught under the beards at the next descent of the needles for effecting the "knocking over."

It has been proposed to use points arranged horizontally at right angles to a double row of needles for receiving the thread to be knitted, sinking it thereon, and transferring it to the needles, which points enter the spaces between the needles; also pendent points that enter the spaces between horizontal needles and act merely as thread-carriers.

We now propose to mount in front of the needles a set of points which are carried by a horizontal bar and stand parallel with and opposite the stems of their respective needles. These points have a short vertical motion, and between them project the jack-sinkers and the dividing-sinkers when they are required to act upon the threads, which they do in the usual manner, pressing it against the points in the same way as heretofore against the needle-stems. By the time the dividing-sinkers have acted the needles will have risen to a position for receiving the thread from the points. For this purpose the points are withdrawn from the thread, and by the further advance of the sinkers the thread will be laid around the stems of the needles. The needles will then descend, be pressed, and the work will be "knocked over" in the usual manner.

In the accompanying drawings, Figures 1 and 2, Sheets 1 and 2, show in front elevation portions of the middle of the Cotton machine as modified to adapt our invention thereto. Fig. 3, Sheet 2, and Figs. 4 and 5, Sheets 3 and 4, are longitudinal vertical sections of the parts of the machine shown at Figs. 1 and 2. Fig. 6, Sheet 5, is a front view of a portion of the machine, showing the mechanism for operating the thread-carriers; and Fig. 7 is a plan view of the same parts. The diagrams from I to VII in Sheet 6, and from VIII to XII, Sheet 7, illustrate the action of the knitting-instruments. The various working cams, hereinafter referred to by letters, are shown in Sheets 8 and 9, as are also their corresponding cams, or those which take the place of the efficient knitting-cams, the latter being shown by dots and marked by corresponding letters with the addition of a star.

In these figures, A is the needle-bar, carrying the bearded needles $a$, which receive an up-and-down motion, as heretofore, but without any "dwell" in their downward progress. The needle-bar A is pivoted, as usual, to rocking arms $A'$, keyed on a rock-shaft, $A^2$, which has its bearings in the main framing. Pendent from this rock-shaft are arms $A^3$, furnished with anti-friction bowls, which, by means of tension-springs $A^{3*}$ are caused to bear upon cams $A^4$, keyed to the cam-shaft. The rotation of this shaft imparts to the needles the rising and falling motions requisite for their receiving the new loops and knocking over the formed course. The needles are advanced to and withdrawn from the presser B by cams $A^5$ on the cam-shaft, which cams bear upon bowls carried by pendent arms $A^6$, keyed to a rock-shaft, $A^7$, having its bearings in the main framing. The arms $A^6$ are connected by links $A^8$ to projections $A^9$, pendent from the needle-bar. Thus an oscillating motion is given to the needle-bar to bring the beards of the needles into contact with the stationary presser-bar and ready for the formed loops of work to be passed onto the beards and over the heads of the needles.

$c$ are the ordinary jack-sinkers, and $c^*$ the dividing-sinkers, mounted respectively in their guides C, as usual. These sinkers, instead of dividing the thread upon the needle-stems, as usual, divide it upon a set of points, $e$, mounted in a bar, E, which brings them in front of the needles to receive the thread from the thread-carriers $f$. These points, it will be seen, are bent out of line in order to bring them, when in position for working, as near as possible to the needles. They are also grooved longitudinally to receive the beards of the needles, (see Diagram X,) it being important that the two lines of instruments $e$ and $a$ should be able to approach near to each other, in order that the work may be close to the points at the time of laying the thread to prevent the formation of a slack selvage, and that they shall remain in close proximity during the transference of the thread from the points to the needles. As the thread is laid over the points $e$ the jack-sinkers $c$ will advance to form the required amount of slack thread. (See Diagram XI.) The dividing-sinkers $c^*$ will then advance and divide the slack thread upon the points. The points will then retire and allow both jack and dividing-sinkers to carry the divided thread to the advancing needles. At this moment the sinkers will effect a more complete dividing of the thread, and they will then retire to allow the knitting to proceed. These motions of the sinkers are obtained by the following means: The jack-sinkers $c$ are advanced by the jacks C' striking against their rear ends, the jacks being operated in succession by the slur-cock, as usual, which slur-cock has a traverse motion, in the manner to be afterward explained. The dividing-sinkers $c^*$ are advanced to and withdrawn from their work by means of the catch-bar $C^2$, which is connected by bracket-arms $C^3$ to the upper extremities of rock-levers $C^4$, which are keyed to a rock-shaft, $C^5$, having its bearings in the main framing. Pendent from this rock-shaft are arms $C^6$, which carry bowls that bear upon cams $C^7$ on the cam-shaft, and it is by the rotation of these cams that the catch-bar is caused to advance and recede. In advancing, this catch-bar bears against the rear ends of the dividing-sinkers, and in retiring it draws back both the sinkers $c^*$ and $c$. To enable it to do this, a vertical reciprocating motion is given to the catch-bar, which enables it to place a lip or flange with which it is provided in front of the projections of all the sinkers.

Standing out from the front of the catch-bar are rigid arms $C^8$, to which are attached rods $C^9$, that couple these arms with arms $C^{10}$, keyed to a rock-shaft, $C^{11}$, having its bearings in the main framing. This rock-shaft is fitted with pendent arms $C^{12}$, carrying bowls that receive the pressure of a pair of cams, $C^{13}$, on the cam-shaft. By the rotation of these cams the catch-bar will be raised and lowered at the proper moments for engaging with or releasing the sinkers.

$d$ are the usual fashioning or shaping points, which are employed to shift the selvage-loops from the selvage-needles onto a narrower width of needles. These points are arranged in groups on the narrowing point-bars D D*, and the traverse motion of these point-bars is derived from narrowing-slides, as in the ordinary Cotton machine. The point-bars D D* are carried by rocking arms D', keyed to a rock-shaft, $D^2$, from which depend arms fitted with bowls that bear upon cams upon the cam-shaft, suitably cut for holding the point-bars out of action, or in the raised position of Figs. 1, 4, and 5, Sheets 1, 3, and 4, and dropping them into their acting position, as hereinafter mentioned.

The point-bar E, carrying the row of points $e$, is pivoted to arms E', carried by a rock-shaft, $E^2$, which has its bearings in the main framing. Arms $E^3$, pendent from this rock-shaft, carry bowls to receive the pressure of a pair of cams, $E^4$, mounted on the cam-shaft, and it is from these cams that the points $e$ receive their vertical motions. In order to modify these motions so as to bring the points down out of the way under the fixed presser-bar and to advance them again into position, bracket-arms $E^5$, pendent from the point-bar E, are connected by links $E^6$ to arms $E^7$ on a rock-shaft, $E^8$, having its bearings in the main framing. Pendent arms $E^9$, keyed to the rock-shaft $E^8$, carry bowls which are pressed upon by a pair of cams, $E^{10}$, on the cam-shaft.

$g$ are the "knocking-over" bits, which are usually stationary during the action of the machine. In the present case, however, they receive a slight oscillating motion to facilitate the throwing of the finished courses of work over the heads of the needles. These knocking-over bits $g$ are mounted on a transverse bar, G, having pendent bracket-arms G', which are jointed to arms $G^2$, keyed to a rock-shaft, $G^3$, having its bearings in the main framing. This rock-shaft has keyed to it pendent arms $G^4$, fitted at their lower ends with bowls that are pressed upon by cams $G^5$ on the cam-shaft.

It should be remarked that all the levers fitted with anti-friction bowls are held to their respective cams by means of tension-springs, as described with reference to the arms $A^3$.

The bar G is pivoted to a hand-lever, $G^6$, which is notched onto the rock-shaft $A^2$ when the knocking-over bits are in their working position. This mode of mounting the bar G is adapted to facilitate the withdrawal of the knocking-over bits from the path of the needles, and of allowing ready access to those needles for the removal and replacement of any points or needles that may be broken.

At the time that the needles have dropped to their lowest position the knocking-over bits $g$ receive from the cams $G^5$ a tipping motion, which enables them to lift the last formed course of work over the beards of the depressed needles and throw that course to the back of the needles.

It has been stated that the object of the present invention is to increase the speed of knitting, and it is for this purpose that the points are introduced to perform the part hitherto assigned to the stems of the needles when the thread is being laid and divided. In order, however, to secure this result, it is requisite to lay in two threads for every complete rotation of the cam-shaft, instead of one, as heretofore. This is effected by a modification of the driving-gear heretofore employed for operating the sliding rods F, to which the thread-carriers $f$ are attached.

Mounted loosely on the cam-shaft is a bevel-wheel, F', (see Fig. 6,) on the boss of which is an annular groove to receive a retaining-clip carried by a fixed bracket, $F^2$. This bevel-wheel is locked to its shaft by a finger or projection, $F^3$, attached to a boss keyed to the shaft, taking into a notch on the boss of the bevel-wheel. This arrangement is designed to disengage the bevel-wheel from its shaft when the shaft is shogged or moved endwise to arrest the knitting action of the machine at the moment that the narrowing or shaping of the work is being performed. The bevel-wheel F' gears into and drives a bevel-wheel, $F^4$, of equal diameter, keyed onto a transverse shaft, $F^5$, which has its bearing on the main framing, and has keyed to its rear end a disk, $F^6$, fitted with a crank-pin. Attached to this pin is a link, $F^7$, which is jointed to an oscillating arm, $F^8$, working on a fulcrum at the base of the machine. This oscillating arm transmits motion through a link-rod, $F^9$, to the ordinary slur-cock $F^{10}$, from which the sliding motions of the thread-carrier rods F are obtained. From this explanation it will be seen that one rotation of the cam-shaft will give one rotation to the disk $F^6$, and consequently a to-and-fro motion to the oscillating arm $F^8$, the slur-cock $F^{10}$, and the thread-carrier rods F, by which means two lays of thread will be delivered to the points $e$ for one rotation of the cam-shaft.

To prevent the bevel-wheel F', when disengaged from the cam-shaft, driving, by its centrifugal action, the bevel-wheel $F^4$, provision is made for locking the wheel F' at the moment of disengagement from its shaft. This locking is effected by means of a bolt, $F^{11}$, which slides in a guide formed for it in the fixed bracket $F^2$, and has two pendent terminations, one of which, shaped like a bevel-wheel tooth, is caused to enter the teeth of the wheel and arrest its motion when disengaged from its shaft. The other end of the sliding bolt enters an annular groove in a collar, $F^{12}$, keyed to the cam-shaft. The same motion, therefore, of this shaft which disengages it from the bevel-wheel F' causes the bolt $F^{11}$ to draw its toothed termination forward, so as to interlock with and stop the rotation of the wheel F', and consequently to render quiescent for the moment the slur-cock $F^{10}$.

By referring to the diagrams, Sheets 6 and 7, the action of the knitting-instruments will be clearly understood. Diagrams I, VIII, and XI show the position the knitting-instruments will assume at the moment the thread is being laid upon the nebs of the sinkers $c$ $c^*$. At this time the points $e$ are at their highest elevation and the needles $a$ are near their lowest position, the knocking-over bits $g$ having just come into action upon the work. Diagram II shows the sinkers $c^*$ advanced toward the the points $e$, at which time the threads which they carried forward will have been divided on the points $e$, the needles $a$, after the knocking over of the work by the bits $g$, having risen to their highest position, ready to receive the thread which the points $e$, by descending, will deliver to them in a divided state. Diagram III shows the points $e$ as having descended just clear of the divided thread, at which moment the needles and the sinkers approach each other, the one to receive the thread and the other to deliver it and complete the division of the thread upon the needle-stems. Diagrams IV, IX, and XII show the thread caught under the beards of the needles and the needles in the pressing position, the presser B having closed the beards of the needles and the last row of formed loops of the work having been landed onto the beards, ready for the action of the knocking-over bits $g$.

It will now be understood that as the needles $a$ complete their descent the knocking-over bits will, by their action, throw over the course of loops to the back of the needles, as before mentioned. While the needles are completing their descent the sinkers $c$ $c^*$ will retire to the dotted position of Diagram IV, ready to be advanced as the points $e$ come again into the position of Diagrams I and VIII.

It is well known to persons conversant with knitting machinery in which fashioned goods—such as hose—are manufactured that prior to the commencement of a shortened course the knitting of the machine is suspended in order to bring into operation the narrowing-points, which, as before stated, transfer the selvage-loops to the contracted width of needles in order to produce a selvage, and it is to provide for the non-delivery of thread at this time that the mechanism described as actuated by the bevel-wheel F' is thrown out of action. The arrest of the motion of the bevel-wheel F' has been described as due to the shogging of the cam-shaft. The result of this shogging is also to throw out of position the cams which actuate the knitting-instruments, and to bring into position others which modify the movements of those instruments and allow of the narrowing of the work to take place.

The various working cams above referred to by letters are shown in Sheets 8 and 9, and their corresponding cams, or those which take the place of the efficient knitting-cams $A^4$ $A^5$ $C^7$ $C^{13}$ $E^4$ $E^{10}$ $G^5$, are shown by dots in the same sheet of drawings, and are lettered correspondingly $A^{4*}$, $A^{5*}$, $C^{7*}$, $C^{13*}$, $E^{4*}$, $E^{10*}$, and $G^{5*}$. When these arms $A^{4*}$, $A^{5*}$, $C^{7*}$, $C^{13*}$, $E^{4*}$, $E^{10*}$, and $G^{5*}$ are brought into position and the knitting action is arrested, the points $d$ will descend from their quiescent position toward that shown in Diagram V, in order to meet the ascending needles. The points $d$ will then cover the beards of the selvage-needles and pass into the loops on their stems, as shown in the diagram. The needles will now rise and fall slightly back from the points. At the same time the points will rise until they have lifted the selvage-loops clear of the needles. They will then receive their inward-traverse motion and take up a position in front of the new selvage-needles, as indicated at Diagram VI. The points and needles will then descend together between the row of knocking-over bits, and the sinkers, advancing, will assist in transferring the loops from the narrowing-points $d$ to the selvage-needles, the points rising out of the loops to insure such transfer when arrived at the position with respect to the needle-heads shown in the Diagram VII. When this transfer of the selvage-loops has been effected the cam-shaft is shogged back to its original position, and, the cams $A^4$, $A^5$, $C^7$, $C^{13}$, $E^4$, $E^{10}$, and $G^5$ coming again into action, the knitting will proceed as before.

It will be understood that during the transference of the selvage-loops the points $e$ (as well as the thread-carriers) will be out of action. To prevent their interfering with the working of the narrowing-points $d$, it is requisite to remove them out of the way. This may be done either by dropping them below the presser or by moving them when in their highest position close to the presser, and in either of these positions they are retained while the narrowing takes place. This is clearly illustrated by the Diagrams V, VI, and VII. On the completion of a course the points $e$ are in the position of Diagrams VIII and XI. Immediately after the knitting of the course or line of loops is completed the shogging of the cam-shaft takes place. This brings into action the cams $E^{4*}$, Sheet 8, which depress the point-bar E, as above mentioned, and retain it in its lowest position until on the shogging of the cam-shaft the knitting action is resumed.

The manner of shogging the cam-shaft automatically is well known to persons conversant with the Cotton machine; but to give completeness to the drawings it has been thought desirable to illustrate this well-known contrivance, in which a traveling tappet-chain is employed to throw the bowl of a rock-lever at the proper moment into the path of a face-cam on the cam-shaft. Figs. 2 and 3, Sheet 2, show this arrangement, in which H is a swinging arm pendent from any fixed point, and carrying a bowl, which bears against a cam, H', on the cam-shaft. The rotation of this cam imparts a vibratory motion to the arm H, which carries a chain-wheel, $H^2$, for receiving the tappet-chain $H^3$. This chain-wheel is furnished with ratchet-teeth, which are in line with a fixed pawl, $H^4$, carried by the framing. As the arm H vibrates the ratchet-teeth are caused to strike against the pawl, and thus the chain-wheel and tappet-chain are ratcheted round. The tappets on the chain, as they come up, are caused to strike against a bell-crank lever, $H^5$, pivoted on the swinging arm H, and thereby to rock it. The lower limb of this bell-crank lever, when acted on by the tappet, will, at the next vibration of the arm H, strike a rock-lever, $H^6$, keyed upon a rock-shaft, $H^7$, mounted in the main framing. An arm, $H^8$, keyed to this rock-shaft, is furnished with a bowl, which, by the movement above mentioned, is rocked into the path of a double-faced cam, $H^9$, on the cam-shaft, the effect of which will be to shift the cam-shaft in the direction of its axis, and thus put the cams before mentioned in and out of action.

Having now set forth the nature of our invention of improvements in knitting machinery and explained the manner of carrying the same into effect, whereby the rate of production of knitted fabrics is increased, we would remark that we are aware that attempts have been made to expedite the operation of knitting by introducing the use of points for receiving the thread and transferring the same to the needles; but the devices heretofore adopted have not proved wholly satisfactory for effecting that result, the chief difficulty in their practical operation having arisen from the uncertain transference of the thread and the imperfect dividing of the thread, from which defective operations perfect selvage work will not be produced.

What we claim as of our invention, and desire to secure by Letters Patent, is—

1. The combination, with the thread-carriers $f$, the bearded needles, the jack and dividing sinkers $c$ $c^*$, and means for operating said carriers, needles, and sinkers, of the points $e$, arranged parallel with and opposite the stems of their respective needles, and means for imparting to said points an up-and-down and to-and-fro motion, substantially as described.

2. The combination, with bearded needles and means for reciprocating them without a dwell, of the jack and dividing sinkers $c$ $c^*$ and points $e$, arranged parallel with and opposite the stems of the needles, and means for operating said sinkers and points, substantially as described.

3. The combination, with reciprocating bearded needles, presser, knocking-over bits, and jack and dividing sinkers, of points $e$, grooved longitudinally to receive the beards of the needles, substantially as described.

SAML. LOWE.
JOHN WILLIAM LAMB.

Witnesses:
MARK SHAW,
  86 *Raleigh St., Nottingham.*
W. H. WARSOP,
  28 *Ilkeston Road, Nottingham.*